(12) United States Patent
Chou et al.

(10) Patent No.: US 7,925,865 B2
(45) Date of Patent: Apr. 12, 2011

(54) ACCURACY OF CORRELATION PREFETCHING VIA BLOCK CORRELATION AND ADAPTIVE PREFETCH DEGREE SELECTION

(75) Inventors: Yuan C. Chou, Los Gatos, CA (US); Yasuko Watanabe, Madison, WI (US)

(73) Assignee: Oracle America, Inc., Redwood Shores, CA (US)

( * ) Notice: Subject to any disclaimer, the term of this patent is extended or adjusted under 35 U.S.C. 154(b) by 282 days.

(21) Appl. No.: 12/131,481

(22) Filed: Jun. 2, 2008

(65) Prior Publication Data

US 2009/0300340 A1    Dec. 3, 2009

(51) Int. Cl.
*G06F 9/30*   (2006.01)
*G06F 13/00*   (2006.01)

(52) U.S. Cl. .......................................... 712/207; 711/137
(58) Field of Classification Search .................. None
See application file for complete search history.

(56) References Cited

U.S. PATENT DOCUMENTS

| | | | |
|---|---|---|---|
| 5,367,656 A * | 11/1994 | Ryan | 711/213 |
| 6,134,633 A | 10/2000 | Jacobs | |
| 6,157,993 A * | 12/2000 | Lewchuk | 711/213 |
| 6,212,603 B1 | 4/2001 | McInerney et al. | |
| 6,321,301 B1 | 11/2001 | Lin et al. | |
| 6,490,658 B1 * | 12/2002 | Ahmed et al. | 711/140 |
| 6,571,318 B1 * | 5/2003 | Sander et al. | 711/137 |
| 6,718,454 B1 | 4/2004 | Ebner et al. | |
| 6,925,534 B2 | 8/2005 | David | |
| 6,951,015 B2 | 9/2005 | Thompson | |
| 7,055,023 B2 * | 5/2006 | Tago et al. | 712/240 |
| 7,238,218 B2 | 7/2007 | Hepner et al. | |
| 7,240,161 B1 | 7/2007 | Boyle | |
| 7,346,680 B2 | 3/2008 | Illikkal et al. | |
| 7,383,402 B2 | 6/2008 | Kalogeropulos et al. | |
| 7,702,857 B2 * | 4/2010 | Gill et al. | 711/137 |
| 2003/0196046 A1 * | 10/2003 | Abdallah et al. | 711/137 |
| 2008/0112409 A1 | 5/2008 | Illikkal et al. | |

OTHER PUBLICATIONS

TCP: Tag Correlating Prefetchers, by Zhigang Hu of IBM Corp.; Margaret Martonosi of Princeton University; and Stefanos Kaxiras of Agere Systems, High-Performance Computer Architecture, 2003, HPCA-9 2003 Proceedings, The Ninth Intern Symposium, Feb. 8-12, 2003, 11 pages.*

Nesbit, K. J., & Smith, J. E. (2005). Data Cache Prefetching Using a Global History Buffer. Ieee Micro, 25(1), 90-97.*

Song, Hui, Cao, Guohong. "Cache-miss-initiated prefetch in mobile environments" Dept. of Computer Science and Engineering, Penn State, Nov. 2004.*

(Continued)

*Primary Examiner* — Jacob Petranek
(74) *Attorney, Agent, or Firm* — Park, Vaughan, Fleming & Dowler, LLP (57) ABSTRACT

In the described embodiments, a method for prefetching data and/or instructions may include generating control flow information for each retired branch instruction. A correlation table may be maintained based on the generated control flow information and cache miss addresses for each retired instruction that incurs one or more cache misses. Each correlation table entry may correspond to an index, and may contain a tag and a correlation list. The correlation list may consist of a specified number of cache miss addresses that most frequently follow the cache miss address for the index. A prefetch operation may be performed for each cache miss based on the contents of the correlation table entry corresponding to the index. The index may generated using a combination of bits of a given cache miss address and one or more bits of the program control flow information for the given cache miss address.

20 Claims, 4 Drawing Sheets

OTHER PUBLICATIONS

G. Hariprakash, R. Achutharaman, Amos R. Omondi, "DSTRIDE: Data-Cache Miss-Address-Based Stride Prefetching Scheme for Multimedia Processors," austcsac, pp. 62, 6th Australasian Computer Systems Architecture Conference (AustCSAC'01), 2001.*

Lai, An-Chow, Fide, Cem, Falsafi, Babak. "Dead-block prediction and dead-block correlating prefetchers" Proceedings of the International Symposium on Computer Architecture, 2001, p. 144-154 Göteborg, Sweden, 2001.*

Ramos, et al.; "Data prefetching in a cache hierarchy with high bandwidth and capacity"; MEDEA/PACT 2006; Sep. 16-20, 2006; Seattle, WA; vol. 35, No. 4; Sep. 2007; 8 pages.

Solihin, et al.; "Prefetching in an Intelligent Memory Architecture Using a Helper Thread"; Proceedings of Workshop on Multithreaded Execution, Architecture and Compilation (MTEAC-5); Dec. 2001; 8 pages.

* cited by examiner

*Branch History Bufffer*

FIG. 3

*Miss Address History Bufffer*

ACCURACY OF CORRELATION PREFETCHING VIA BLOCK CORRELATION AND ADAPTIVE PREFETCH DEGREE SELECTION

BACKGROUND OF THE INVENTION

1. Field of the Invention

This invention relates generally to the field of memory interface design and, more particularly, to cache design in a computer system.

2. Description of the Related Art

With present-day computer systems becoming increasingly more complex, and advances in technology leading to ever increasing processor speeds, it is becoming more and more difficult to optimize system performance, which oftentimes depends largely on the bandwidth and latency of the given system's memory. Consequently, accessing memory with the lowest latency, and highest availability of memory bandwidth may improve and/or optimize the system's performance. As the required time to access the memory and complete a given memory request increases, the system slows down. Thus, any reduction in access time, and/or an overall increase in throughput on the memory bus may benefit system performance.

A large number of systems, including desktop computers, graphics adapter cards and notebook computers among others, use Dynamic random access memory (DRAM). DRAM devices provide many advantages over other memory technologies, including and most notably, static random access memory (SRAM) devices. The most important of these benefits are higher storage densities and less power consumption. However, these benefits come at the expense of various time delays incurred when preparing the memory cells and other components within DRAM devices for each subsequent access, for example before/after each read/write access. Examples of such delays include the time required to perform row precharge, row refresh, and row activation. In order to more precisely manage and control memory operations when incurring these delays, additional commands—which are transmitted between read/write accesses—have been created, resulting in additional overhead.

Modern processors (e.g. microprocessors, controllers, microcontrollers or central processing units, i.e. CPUs) are typically faster than the memory (e.g. system DRAM) where the programs and program data are stored, resulting in the microprosessor potentially stalling, i.e. not operating at optimum performance, when instructions and/or data cannot be provided fast enough to the processor for the processor to keep executing in an uninterrupted manner. One solution to this problem has been the introduction of cache memory used by the processor to reduce the average time spent on accessing system memory. In general, a cache memory, most often simply referred to as cache, is a storage location that holds copies of data that may have been computed earlier, and/or stored elsewhere in the system, for example in system memory, from where it would generally take longer to fetch that data, e.g. due to longer access times, compared to the time it takes to fetch it from the cache. In other words, a cache is a temporary storage area where frequently accessed data can be stored for rapid access. Once the data has been stored in the cache, the data can be used in the future by accessing the cached copy rather than re-fetching or recomputing the original data, thereby reducing the average access time. Caches, therefore, help expedite data access that the processor would otherwise need to fetch the data from main memory.

In general, a processor cache is a typically smaller and faster memory used by the processor to store copies of the data from the most frequently used system (main) memory locations, and is oftentimes configured on the same die as the processor itself. The average latency corresponding to memory accesses will correspond more closely to the latency of the processor cache, (CPU cache), rather than to the latency of the system memory, if most memory accesses are to the CPU cache. In systems configured with processors operating with a cache memory, when the processor needs to access a location in main memory, it first checks to determine whether the data corresponding to that main memory location is in the CPU cache. This is typically performed by comparing the address of the memory location to all cache tags in the cache. If a tag in the cache corresponds to the address of the memory location, the lookup operation results in a cache hit, otherwise it results in a cache miss. In the case of a cache hit, the processor immediately accesses the data in the cache line. The proportion of cache accesses resulting in a cache hit is referred to as the hit rate, which is generally used as an indicator of the cache memory's effectiveness. When a cache miss occurs, most caches allocate a new entry comprising a tag that corresponds to the address of the memory location, and a copy of the data from system memory. The reference can then be applied to the new entry, just as for a cache hit. Cache misses are comparatively slow since they require accessing the main system memory, incurring a delay due to the difference in speed between the system memory and the cache, while also incuring an additional overhead required for storing the new data in the cache before it is delivered to the processor.

Many modern processors have at least three independent caches, which include an instruction cache to speed up executable instruction load, a data cache to speed up data load and store, and a translation buffer used to speed up virtual-to-physical address translation for both executable instructions and data. Another issue associated with caches is the tradeoff between cache latency and cache hit rate. Larger caches typically have better hit rates but have a longer latency. In order to optimize systems in view of this tradeoff, many computers use multiple levels of cache, or multiple cache-levels, with smaller, faster caches backed up by larger, slower caches. Multi-level caches generally operate by checking the smallest cache, which is typically designated as the lowest-level cache, e.g. Level 1 (L1) cache, first, and if the result is a cache hit, the processor may be able to proceed at a high speed. If the result for L1 cache is a cache miss, the next larger cache (L2) is checked, and so on, before the external memory has to be accessed. As the latency difference between main memory and the fastest cache has become larger, the number of cache levels has risen. For example, some processors are now configured with as many as three levels of on-chip cache, including a level 3 (L3) cache in addition to L2 and L1 caches.

Typically, the performance of many applications running on a given processor or processors can be limited by the amount of time the processor is stalled while servicing cache misses that require accesses to main memory. This is true even for very aggressive chip multithreading (CMT) processors. For example, for an aggressive 128-strand CMT processor with a memory latency of 360 processor clocks, simulations show that performance for TPC-C and SPECjbb2005 improves by 39% and 26% respectively if the cache misses are eliminated. For the SPECint2006 benchmark suite, the geometric mean performance of the suite improves by 18% if the cache misses are eliminated, and the performance of some of the individual benchmarks in the suite can improve by as much as 96%.

Oftentimes a microprocessor will use prefetching to speed up execution by reducing processor stalls. Prefetching typically comprises the processor fetching one or more instructions and/or data from the system memory some time before the processor actually needs the respective instructions and/or data. This eliminates the need for the processor to wait for the memory to answer its request. The prefetched instruction and/or data may simply be the next instruction and/or next required chunk of data in the currently running program, and may be fetched while the current instruction is being executed. The prefetch may also be part of a complex prediction algorithm, where the processor tries to anticipate the result of a calculation and fetch the proper instructions and/or data in advance. One common prefetching approach includes performing a sequential readahead. In its simplest form, a sequential readahead is implemented to prefetch one block beyond a requested block. When prefetching one block, the next block may be prefetched on each reference, it may be prefetched only on a miss, or it may be prefetched only if the referenced block is accessed for the first time. Another form of sequential prefetching implements prefetching a specified number of blocks, instead of a single block, with the number of prefetched blocks typically referred to as the degree of prefetch, or prefetch degree. In other words, the prefetch degree is an indicator used to determine how many prefetches are performed for a given memory access request. For example, if "X" was the last memory access request and "P" was the last prefetch that was issued in an access stream, then on the next access (i.e. access "X+1") the prefetch degree would determine how many prefetches were issued. For example, if the prefetch degree was 4, then prefetches "P+1", "P+2", "P+3", and "P+4" would be issued.

An advanced prefetching technique is correlation prefetching (hardware and/or software), which typically uses the current state of the reference or miss stream to predict and prefetch future misses. Experimental evaluations have shown that hardware correlation prefetching is a promising technique for eliminating cache misses. However, one of the drawbacks of correlation prefetching is its relatively poor accuracy. Inaccurate prefetches not only pollute caches but also waste memory bandwidth. Memory bandwidth is a precious resource in CMT processors where the memory bandwidth of the processor is shared by the many concurrently running threads. This problem can be aggravated by the increased cache miss rates caused by the sharing of the caches by the many threads.

Other corresponding issues related to the prior art will become apparent to one skilled in the art after comparing such prior art with the present invention as described herein.

SUMMARY OF THE INVENTION

In one set of embodiments, the accuracy of a correlation prefetcher may be improved by exploiting the control flow correlation between basic blocks in addition to the correlation between cache miss addresses. In another set of embodiments, the correlation prefetcher may further be improved by adaptively varying the number of prefetches issued for a given correlation table entry, based on the past accuracy of the prefetches issued from that entry.

A method for prefetching data and/or instructions from a main memory to a secondary memory, e.g. a cache memory (such as a Level 2 cache memory) may include generating control flow information by storing respective information for each retired instruction, e.g. retired branch instruction. The method may further include storing respective one or more addresses for each retired branch instruction that incurs one or more secondary memory misses, e.g. cache misses, wherein the respective one or more addresses (e.g. cache miss addresses) correspond respectively to the one or more cache misses. A prefetch operation may be performed for each incurred cache miss, according to the respective cache miss address that corresponds to the incurred cache miss, the generated control flow information, and the stored cache miss addresses.

Correlations between cache miss addresses (e.g. for Level 2 cache load or instruction misses) may be stored in a correlation table. The correlation table may be indexed using a combination of a subset of bits from the cache miss address (i.e. the index address), and some bits representing the control flow (history) that led to the cache miss. The control flow history may either be represented by whether the branches leading up to the cache miss were taken/not taken (1 bit per branch) or it may be represented by bits from the actual targets of the branches leading up to the cache miss. Each correlation table entry may contain a tag and a correlation list that may consist of a first number (K) of miss addresses that most frequently follow the index address. The correlation list may be managed using a least recently used (LRU) policy, with the LRU miss address replaced when space is needed for inserting a new miss address that is not already in the list. The LRU information may also be part of the correlation table entry.

Correlation table entries may be updated each time a branch instruction that incurs a cache miss is retired. First, at the retirement of each branch instruction, depending on the type of control flow history chosen by the implementation, the direction of the branch instruction (taken/not taken) or the target of the branch instruction may be recorded in a Branch History Buffer, which may be a circular buffer structure. At the retirement of each instruction that incurs a cache miss, e.g. a L2 cache instruction miss and/or a L2 cache load miss, the miss address/addresses may be recorded in a Miss Address History Buffer, which may also be a circular buffer, along with the most recent control flow history as obtained from the Branch History Buffer. The least recently stored (i.e. oldest) miss address in the Miss Address History Buffer may be used to index the correlation table. More specifically, a combination of bits from the oldest miss address and bits from the control flow history corresponding to the oldest miss address may be used to form the index into the correlation table.

If an entry does not exist in the correlation table at that index, a new entry may be generated to correspond to that index. The tag for the new entry may be generated, and all the other miss addresses from the Miss Address History Buffer may be copied to the correlation list of the new entry. If an entry already exists in the correlation table at that index, and the tag of the existing entry matches a tag corresponding to the miss address, the correlation list for that entry may be updated with the other miss addresses from the Miss Address History Buffer. Specifically, if the miss address is already in the correlation list, the LRU for that entry may be updated to reflect it. If the miss address is not already in the correlation list, it may be added to the list, possibly replacing the LRU miss address in the list. If an entry already exists in the correlation table at that index, but the tag of the existing entry does not match the tag corresponding to the miss address, one of several options may be implemented. One possible option may be to invalidate the existing (matching) entry and allocate a new entry to correspond to that index.

The correlation table may then be used to generate prefetches. Every time a cache miss is incurred, e.g. a L2 cache instruction miss or a L2 cache load miss, a correlation prefetcher controller may effect a lookup of the correlation table. The correlation table may be indexed using a combination of bits from the miss address corresponding to the cache miss, and bits from the control flow history leading up to the cache miss (as previously described). If there is a tag match, a specified number (D—i.e. the chosen prefetch degree) of the most recently used miss addresses in the entry's correlation list may be used to generate prefetches. Prefetches may be dropped if the line to be prefetched is already in the cache or the prefetch address matches an entry in the processor's cache miss buffer, which may be configured to keep track of outstanding cache misses. Otherwise, the prefetches may be issued to main memory and the prefetched lines may be installed in the cache.

Alternatively, instead of bringing prefetched lines directly into the cache (e.g. into the L2 cache), the prefetched lines may be brought into a prefetch buffer that is searched in parallel with the cache, and the lines may only be transferred to the cache when they are actually used. Each cache line (or prefetch buffer entry) may also be augmented with one extra bit to indicate whether the line is brought in by a prefetch, or a demand miss. When a demand request hits a prefetched line in the cache (or prefetch buffer entry), a lookup to the correlation table may be performed, and upon a tag match, prefetches may be issued in the same manner as described above. The prefetch bit in the cache line (or prefetch buffer entry) may then be reset.

In one set of embodiments, the number of prefetches issued (i.e. the prefetch degree) may be varied for each given correlation table entry, based on the past accuracy of the issued prefetches corresponding to that entry. For entries whose prefetches are more accurate, it may be desirable to have a larger prefetch degree for that entry. Conversely, for entries whose prefetches are less accurate, it may be desirable to have a smaller prefetch degree for that entry. In one set of embodiments, each correlation table entry may be augmented with three additional fields: the number of prefetches issued, number of prefetch hits, and a counter value, which may correspond to an n-bit counter, e.g. a 2-bit saturating counter. The first two additional fields may be used to calculate the accuracy of the most recent prefetches issued for that entry, while the third additional field may be used to remember the past accuracy history of that entry. When a new correlation table is allocated, the first two additional fields may both initialized to zero while the third additional field may be set to a specified initial value, which may implemented as a design parameter.

When a correlation table entry is accessed to issue prefetches, the accuracy of the most recent prefetches issued for that entry may be calculated using the ratio of the number of prefetch hits to the number of prefetches issued. Alternatively, since the number of prefetch hits and number of prefetches issued may all be small integers, a truth table may be used to compute the approximate accuracy. If the accuracy exceeds a specified upper threshold value, the counter value may be incremented, if it is not already saturated. If the accuracy is below a specified lower threshold value, the counter value may be decremented if it is not already zero. If the accuracy is between the specified upper threshold value and the specified lower threshold value, the counter value may be left unchanged. Based on the counter value, a variable number of the most recently used miss addresses in the correlation table entry's correlation list may be used to generate prefetches.

The mapping between the counter value and the prefetch degree may be implemented as a design parameter. The number of prefetches issued field may then be set to the number of prefetches actually issued, which may be lower than the chosen prefetch degree when some of the prefetches turn out to be duplicates. The number of prefetch hits field may be reset to zero. The number of prefetch hits field may be incremented whenever a line prefetched by that correlation table entry is actually used by a demand request.

The accuracy of a correlation prefetcher designed according to the principles described above may be enhanced, making it more suitable for implementation in chip multithreading processors where memory bandwidth may be a precious resource. The basic block correlation technique and adaptive prefetch degree correlation technique described above may each be implemented together or individually when designing a correlation prefetch controller and/or when performing correlation prefetching to transfer instructions and/or data from a main (primary) memory to a secondary (cache) memory.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

The expressions "cache miss" and "cache hit" are used herein according to their well-established and accepted meaning by those skilled in the art, as also previously described. Accordingly, an "instruction miss" refers to a cache miss when attempting to retrieve an instruction(s) from main memory, a "load miss" refers to a cache miss when attempting to retrieve data from main memory, and a "store miss" refers to a cache miss when attempting to store data in main memory.

Figure 6:
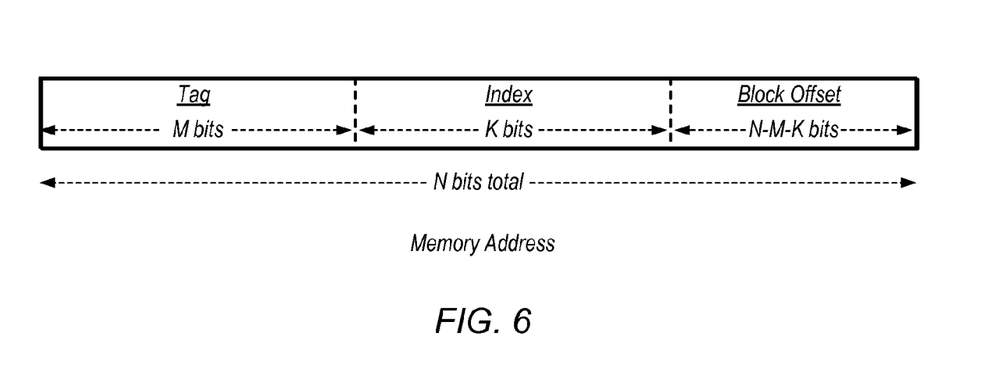
FIG. 6 shows one example of a memory address divided into a tag, and index address, and a block offset for referencing a cache line.

When handling a request targeting a memory address in main memory, the targeted memory address may be divided into three segments for referencing a cache line. As shown in FIG. 6, a memory address comprising N bits (where N is a positive integer) may be divided into a tag, an index address, and a block offset. As shown, the tag may correspond to the M most significant bits (MSB) of the memory address, the index address may correspond to the next K bits (from the last bit in the tag) of the memory address, and the block offset may correspond to the remaining bits of the memory address (i.e. the N−M−K [N minus M minus K] least significant bits— LSB—of the memory address). As used herein, "cache miss address" or "miss address" may generally refer to the index address shown in FIG. 6. In other words, miss address or cache miss address may refer to the index address portion of the targeted memory address (as shown in FIG. 6) used by the cache controller when performing a cache lookup for the targeted memory address. However, alternate embodiments designating different portions of a memory address to reference "miss addresses" and "cache miss addresses" are possible and are contemplated, and the prefetching techniques discussed herein are not meant to be limited to the presented embodiments.

In addition, "main memory" in this context refers to system memory, or any memory distinct from the cache memory (or cache memories), and which may be configured within some systems as a possible primary means for storing the data. The data stored in the main memory may be temporarily stored in the cache memory (or cache memories). In other words, the main memory in this context may be considered the memory for which caching is performed using the cache memory or cache memories. Overall, the cache memories may represent "secondary" memories used for storing/caching data corresponding to data stored in the main memory, which, as mentioned above, may also be considered a "primary" memory. Accordingly, a "cache miss" may be more generally referred to as a "secondary memory miss", and a "cache hit" may be more generally referred to as a "secondary memory hit".

Figure 1:
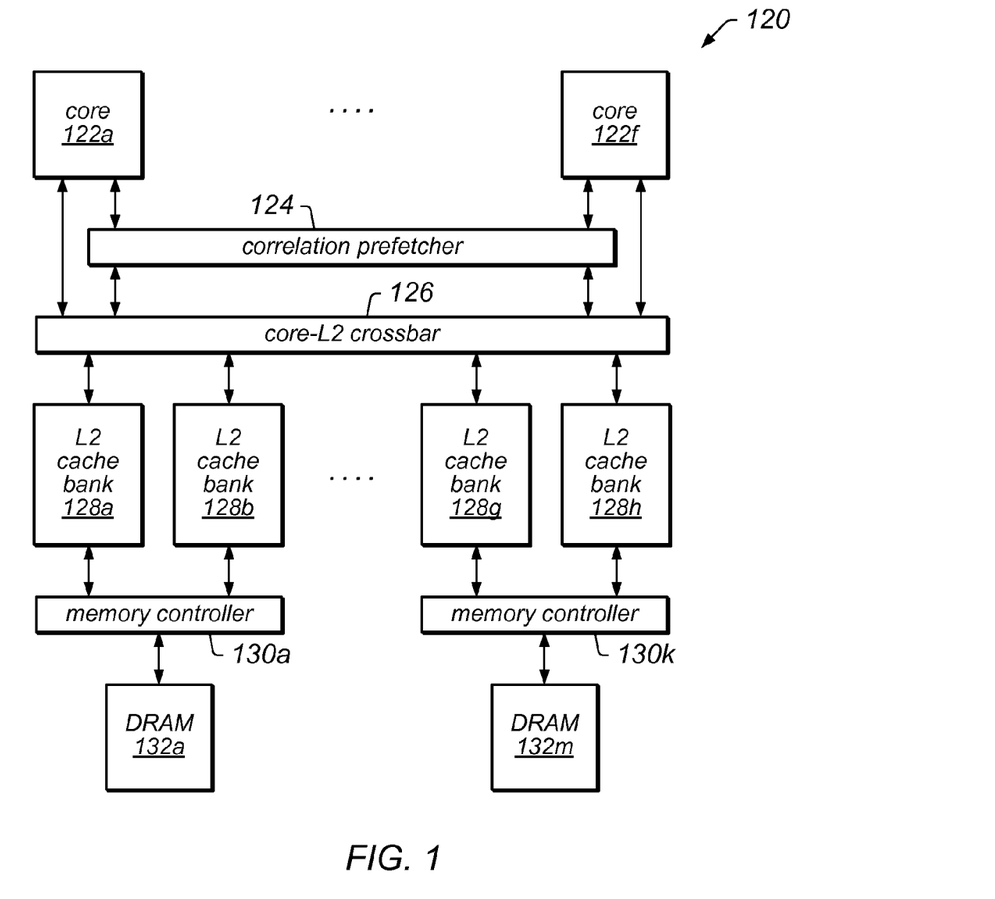
FIG. 1 a partial logic diagram of an exemplary system configured to perform improved correlation prefetching via block correlation and adaptive prefetch degree selection, according to one embodiment.

FIG. 1 shows a partial block diagram of an exemplary system 120 that may include one or more processors or processor cores (122a-122f), and a corresponding cache control structure configured to improve performance of the system through the use of caches 128a-128h. It should be noted that the number of processors (or cores) 122a-122f, the number of caches (cache banks 128a-128h), the number of memory controller blocks or elements 130a-130k, and the number of system memory elements (in this case DRAM) 132a-132m shown in FIG. 1 may vary, and FIG. 1 shows only one of many possible embodiments that may be similarly configured. Thus, alternate embodiments may include additional and/or fewer processors (cores), caches, and/or memory components configured in a manner similar to what is shown in FIG. 1. A crossbar switch 126 may be configured to establish proper connectivity between cache memories 128a-128h and processor cores 122a-122f. Data may be accessed and transferred between caches 128a-128h and system memory 132a-132m via memory controllers 130a-130k. However, alternate embodiments and different hardware configurations for implementing cache support for cores 122a-122f are possible and are contemplated, with each embodiment enabled to store data structures and tables that may be used in performing correlation prefetching as described herein.

In one set of embodiments, a correlation prefetcher block 124 may be coupled between a core-cache (e.g. core-L2 cache) crossbar switch, and cores 122a-122f, to at least partially determine data transfer and movement between cache memories 128a-128h and processor cores 122a-122f. In one embodiment, system 120 may be a multi-core processor chip, and all the components shown in FIG. 1 may be configured on the single multi-core processor chip. To manage cache access and prefetching, correlation prefetcher 124 may include a Branch History Buffer (BHB) and a Miss Address History Buffer (AHB), and a Correlation Table may be stored in correlation prefetcher block 124 and/or in L2 cache banks 128a-128h and/or in DRAM 132a-132m. Correlation prefetcher block 124 may operate as a control unit configured to perform certain functions and/or operations to facilitate correlation prefetching in system 120. The correlation prefetching may thereby be performed using the Branch History Buffer, the Miss Address History Buffer and the Correlation Table, as will further be described in detail below. In one set of embodiments, the Branch History Buffer, the Miss Address History Buffer and the Correlation Table may be configured to implement basic block correlation prefetching and/or enhanced block correlation prefetching as also disclosed below.

Basic Block Correlation Prefetching

Basic Block Correlation Prefetching (BBCP) may comprise a system and method for exploiting control flow correlation to improve the accuracy of a correlation prefetcher. A conventional correlation prefetcher would typically predict future miss addresses based on a current miss address. In contrast, BBCP may operate to predict future miss addresses based on a current miss address in addition to information corresponding to the program control flow that led to the current miss address. The control flow information may disambiguate the same miss address seen in different code sections, enabling more accurate prediction of future miss addresses that may be seen by that code section.

In one set of embodiments, BBCP may be configured to target instruction misses and load misses from a level two (L2) cache. Alternate embodiments, however, may be configured to target other cache levels, and the BBCP may in general be equally applicable to other levels of the cache hierarchy (such as a level three cache, for example) as well as other cache miss types (e.g. store misses). Those skilled in the art will appreciate that various embodiments and implementations of BBCP described herein are meant to serve as examples, and that BBCP may also be applied to a variety of different structures and memories, where prefetching instructions and/or data to improve performance may be desirable.

Figure 2:
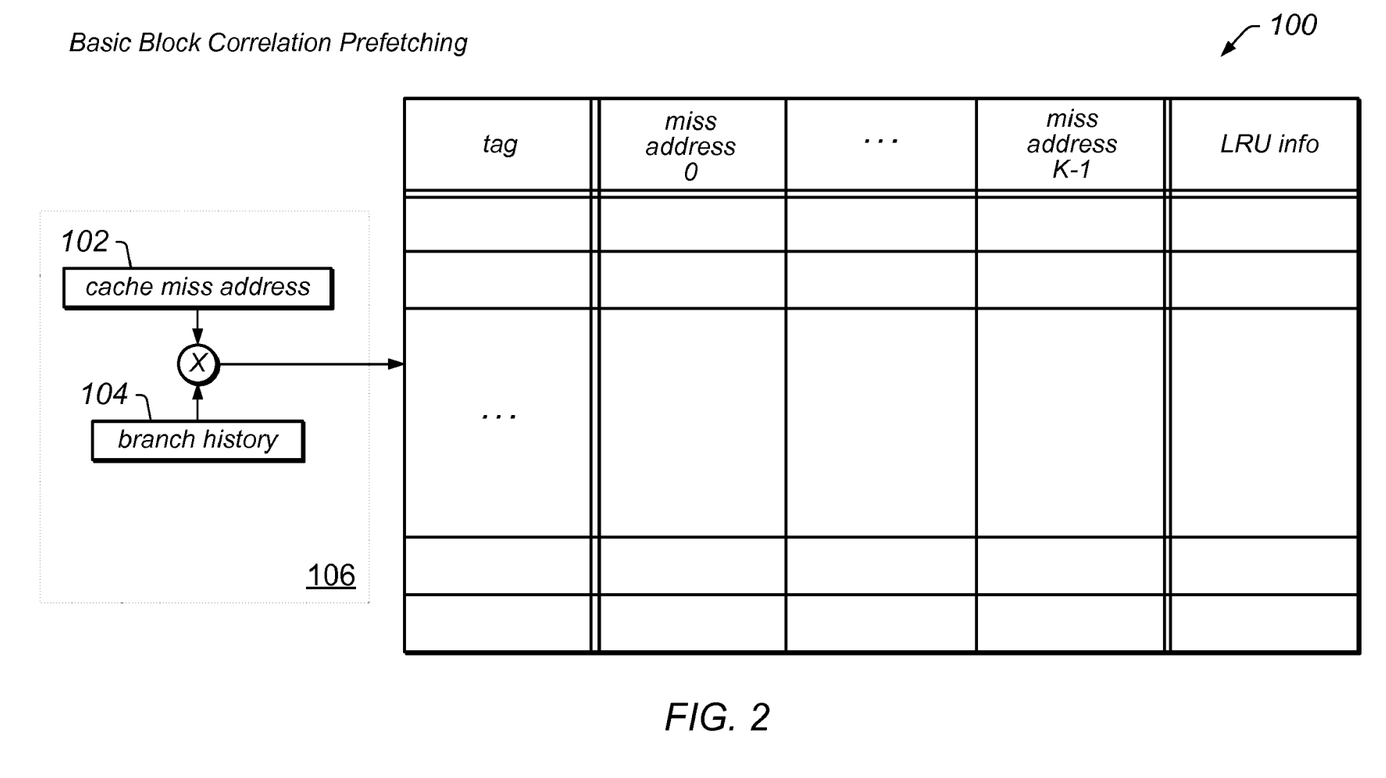
FIG. 2 shows one embodiment of a basic block correlation table indexed according to a cache miss address and branch history corresponding to the cache miss address.

FIG. 2 shows one embodiment of BBCP in which correlations between memory miss addresses, for example a level 2 (L2) cache memory miss addresses (such as load or instruction addresses) are stored in a correlation table 100. Correlation table 100 may be indexed using a combination of a subset of bits from cache miss address 102 (that is, from the index address corresponding to the cache miss) and additional bits (or an additional subset of bits) 104 representing, or corresponding to a control flow that lead to the cache miss. Indexing in this case may include generating a lookup address used to reference and/or obtain an entry in/from table 100. In other words, each respective value of index 106 may correspond to a respective row, or entry in table 100, which may be stored in a variety of locations within the system, for example in correlation prefetcher block 124, in L2 cache banks 128a-128h, and/or in DRAM 132a-132m, in the system shown in FIG. 1. Index 106 may be generated by combining a specified number of bits and/or subsets of bits, from cache miss address 102 and branch history 104, in a variety of ways. For example, index 106 to correlation table 100 may be generated by concatenating select/specified bits from cache miss address 102 and select/specified bits from branch history 104, or performing certain logic operations on those same bits.

In one set of embodiments, index 106 to correlation table 100 may comprise a first number of bits (e.g. N bits, where N is a positive integer), and may be generated by concatenating a subset of bits, or a second number of bits (e.g. M bits, where M is a positive integer having a value lower than N) of the index address (which is the cache miss address), and a third number of bits (defined in this case as N−M bits) that may correspond to control flow history. For example, if an index (lookup address) 106 to correlation table 100 comprises 16 bits, the index 106 may be generated by concatenating 12 bits of cache miss address 102 and 4 bits corresponding to branch history 104. Alternatively, index 106 may be generated by performing certain logic operations, which may comprise basic logic functions such as AND, OR, or exclusive OR (XOR). For example, M bits of the index address 102 and M bits of control flow history 104 may be provided as respective sets of inputs into an XOR function, where each of the M bits of index address 102 and a respective corresponding one of the M bits of branch history 104 may be the respective inputs to a corresponding two-input XOR gate (in other words, M bits of cache miss address 102 may be XOR'ed with M bits of control flow (or branch) history 104). Furthermore, control flow history 104 may either be represented by whether the branches leading up to the cache miss were taken and/or not taken (e.g. represented by 1 bit per branch) or it may be represented by specified bits from the actual target addresses of the branches leading up to the cache miss.

As shown in FIG. 2, each entry in correlation table 100 may contain a tag and a correlation list comprising a specified number of miss addresses (e.g. K miss addresses, where K may be a positive integer) that most frequently follow index address 102. That is, the correlation list may anticipate miss addresses (index addresses) that the system, or a processor in the system, is likely to encounter after having a cache miss at index address (cache miss address) 102. The correlation list may be managed using a least recently used (LRU) policy, with the LRU miss address being replaced when space is needed for inserting a new miss address that is not already in the correlation list. This LRU information may also be included as part of the correlation table entry for a given index 106.

Figure 3:
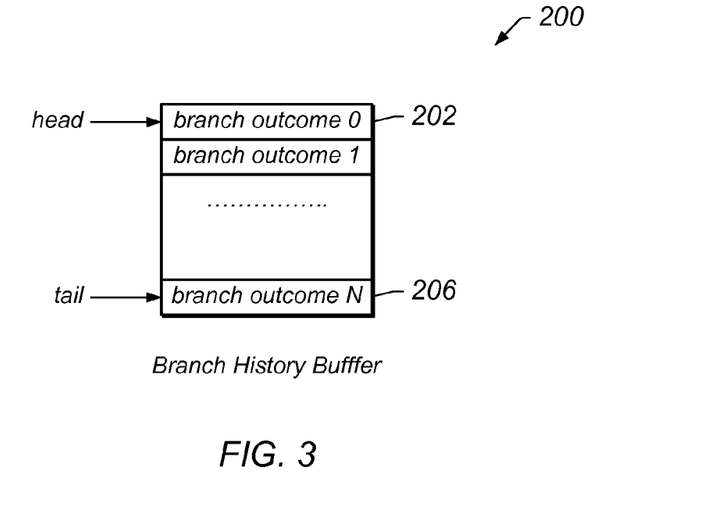
FIG. 3 shows a diagram of one embodiment of a branch history buffer.

Correlation table 100 may be updated as follows. At the retirement of every branch instruction, depending on the type of control flow history 104 chosen by the implementation, the direction of the branch instruction (i.e. whether the branch has been taken or not taken) and the target address of the branch instruction may be recorded as branch outcomes in a storage structure/array, which may be a circular buffer structure, and which is referred to herein as a Branch History Buffer (BHB). FIG. 3 shows one embodiment of the structure of a BHB 200. As shown in FIG. 3, a head pointer may point to a least recent, or oldest branch outcome 202, and a tail pointer may point to a most recent branch outcome 206. As previously indicated, BHB 200 may be stored in correlation prefetcher 104 shown in FIG. 1, for a multi-processor system similar to system 120 in FIG. 1.

Figure 4:
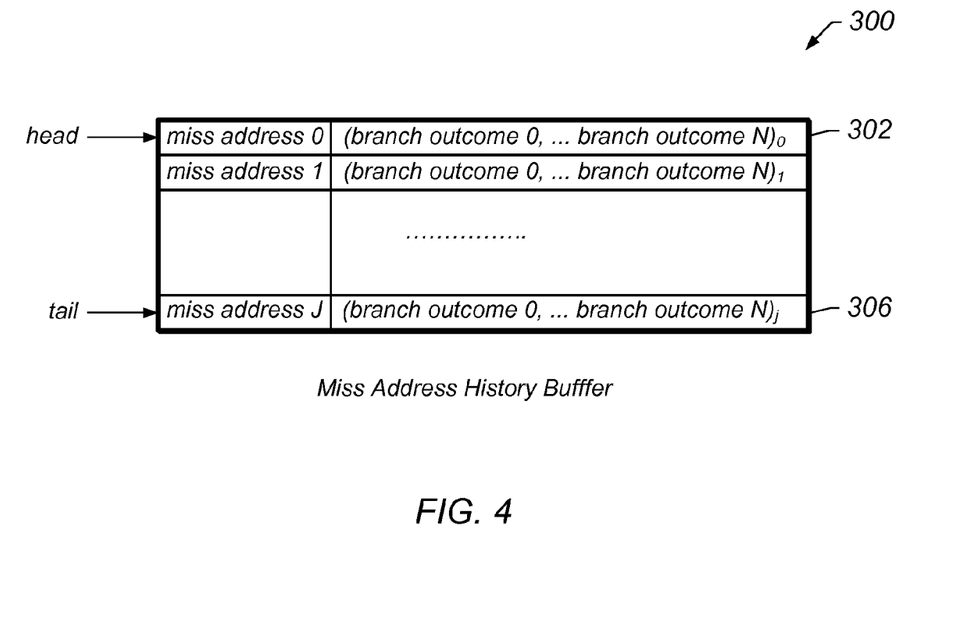
FIG. 4 shows a diagram of one embodiment of a miss address history buffer.

At the retirement of every instruction that incurred a memory miss, e.g. a L2 cache instruction miss and/or L2 cache load miss, the miss address or miss addresses may be recorded in a storage structure/array, which may also be a circular buffer, and which is referred to herein as a Miss Address History Buffer (AHB), along with the most recent control flow history that led to the instruction (which resulted in the cache miss), as obtained from the Branch History Buffer. In other words, BHB 200 may be used to track control flow in general for each branch instruction, while AHB 300 may be used to track control flow specifically for cache misses. FIG. 4 shows one embodiment of the structure of an AHB 300. As shown in FIG. 4, the AHB 300 may be of size (J+1), where J a positive integer number that is less than or equal to K (where K is a positive integer and is the number of miss addresses stored in correlation table 100 shown in FIG. 1, as described above). Similar to BHB 200, AHB 300 may also be stored in correlation prefetcher 104 shown in FIG. 1, for a system similar to system 120 in FIG. 1, as previously indicated. A head pointer in AHB 300 may point to the least recent, or oldest miss address 302 entry stored in AHB 300, and a tail pointer may point to the most recent miss address 306 entry stored in AHB 300. The oldest miss address 302 entry in AHB 300 may index the correlation table 100 by using a combination of bits from the miss address and bits from its control flow history, where the control flow history is indicated in AHB 300 by the "branch outcome 0, . . . branch outcome N" portion of the entry corresponding to that miss address.

If there is no existing entry in correlation table 100 at the thereby generated index (or lookup address), a new entry into correlation table 100 may be allocated. A tag for the entry may be generated, and all the other J miss addresses in AHB 300 may be copied to the correlation list of the entry. If there is already an existing entry at that index of the correlation table 100 with a matching tag, the correlation list for that entry may be updated with the other J miss addresses in AHB 300. Specifically, if the miss address is already in the correlation list, the least recently used (LRU) miss address for that entry is updated to reflect it. If the miss address is not already in the correlation list, it may be added to the list, possibly replacing the LRU miss address in the list. If there is an existing entry at that index of correlation table 100 with a different tag, the update may be performed in one of many possible ways. A simplest option may be to invalidate the existing entry and allocating a new entry.

Generating Prefetches

Correlation table 100 may be used to generate prefetches in the following manner. Every memory access miss (cache miss), for example a L2 cache instruction miss or a L2 cache load miss, may result in a lookup to correlation table 100. When performing the lookup, correlation table 100 may be indexed using a combination of bits from its miss address (index address) 102 and bits from the control flow history 104 leading up to the miss (as described above and as shown in FIG. 2). If there is a tag match, the chosen prefetch degree (D) of the most recently used miss addresses in the entry's correlation list may be used to generate prefetches. Prefetches may be dropped if the line to be prefetched is already in the cache, or if the prefetch address matches an entry in the processor's corresponding cache/memory (e.g. L2 cache) miss buffer, which may be configured to keep track of outstanding misses (e.g. L2 cache misses). Otherwise, the prefetches may be issued to main memory and the prefetched lines may be installed in the cache (e.g. L2 cache). It should be noted again, that while L2 cache operations are described for illustrative purposes, the operations described herein are not limited to L2 cache, and similar methods of operation may equally be applied to any level cache and/or memory used for backing up and/or duplicating data. Alternatively, instead of bringing prefetched lines directly into the L2 cache, they may be brought into a prefetch buffer that is searched in parallel with the L2 cache, and the lines may only be transferred to the L2 cache when they are actually used. Each L2 cache line (or prefetch buffer entry) may also be augmented with one extra bit to indicate whether the line is brought in by a prefetch or by a demand miss. When a demand request hits a prefetched line in the L2 cache (or prefetch buffer entry), a lookup into correlation table 100 may be performed, and upon a tag match, prefetches may be issued in a manner similar to what has been described above. The prefetch bit in the L2 cache line (or prefetch buffer entry) may then be reset.

Adaptive Prefetch Degree Selection

In one set of embodiments, the number of prefetches to be issued (i.e. the prefetch degree) may be adaptively varied for a given correlation table entry, based on the past accuracy of the prefetches issued from that entry. This is in contrast to how correlation prefetching is conventionally performed, where the prefetch degree is typically fixed at design time and is the same for all entries of the correlation table. However, as prefetch accuracy may vary across correlation table entries, it may be advantageous to adaptively vary the prefetch degree accordingly. For example, for entries whose prefetches are more accurate, it may be desirable to have a larger prefetch degree for that entry. Conversely, for entries whose prefetches are less accurate, it may be desirable to have a smaller prefetch degree for that entry.

Figure 5:
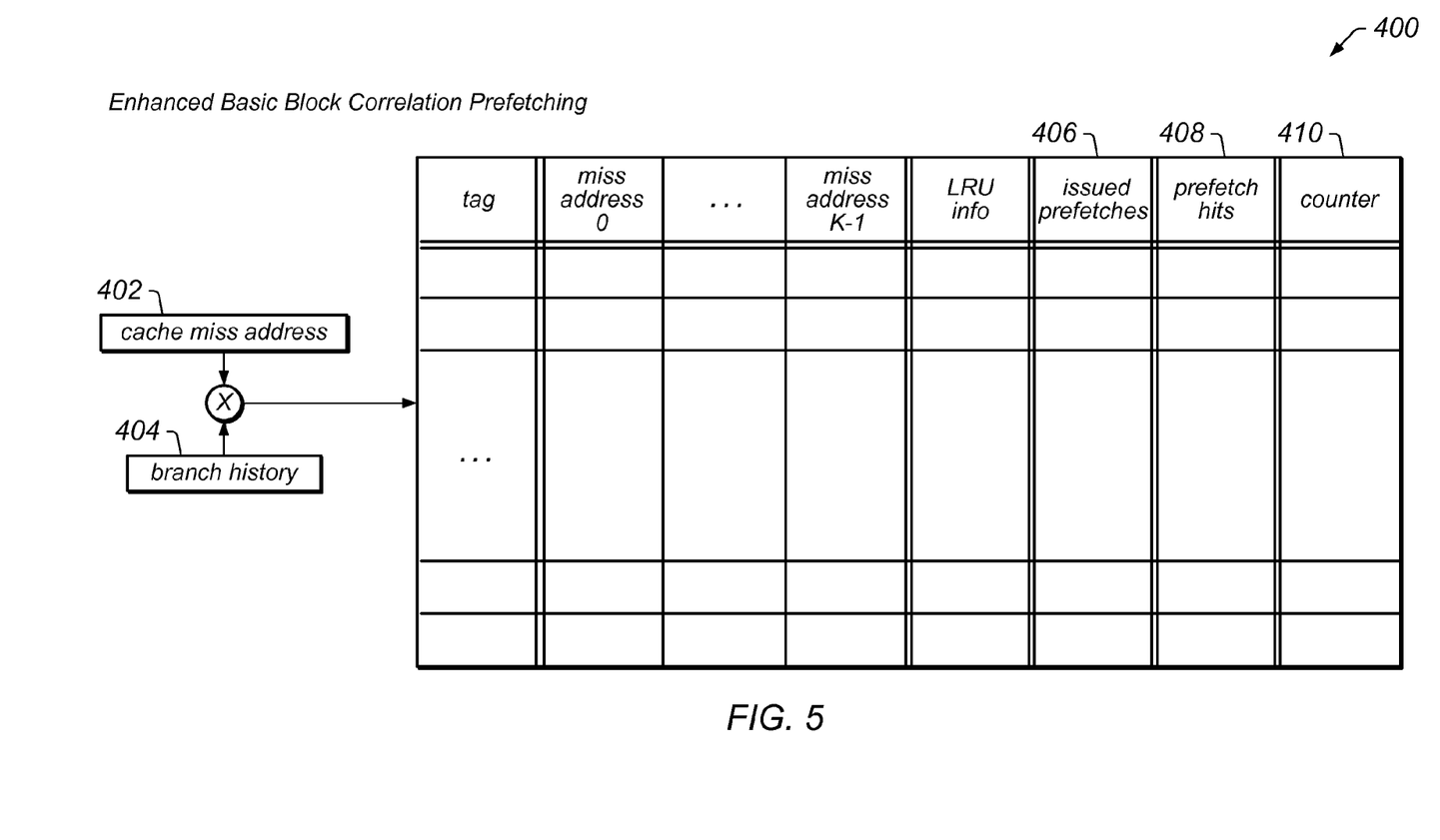
FIG. 5 shows one embodiment of an enhanced basic block correlation table indexed according to a cache miss address and branch history corresponding to the cache miss address.

Consequently, each correlation table entry (e.g. for table 100 of FIG. 2) may be augmented with three additional fields, as shown in FIG. 5. Table 400 is one embodiment of an augmented correlation table having three additional fields for each entry: a number of issued prefetches field 406, a number of prefetch hits field 408, and a saturating counter field 410, where the counter may be an n-bit counter, with 'n' representing the number of bits indicative of the resolution of the counter, e.g. a 2-bit counter. Fields 406 and 408 may be used to calculate the accuracy of the most recent prefetches issued for that entry, while field 410 may be used to keep track of the past accuracy history of that entry. When a new correlation table entry is allocated, fields 406 and 408 may both be initialized to zero, while field 410 may be set to a specified initial value (which may be a design parameter). When an entry in correlation table 400 is accessed to issue prefetches, the accuracy of the most recent prefetches issued for that entry may be calculated using the ratio of the number of prefetch hits (obtained from field 408) to the number of prefetches issued (obtained from field 406). Alternatively, since the number of prefetch hits and number of prefetches issued are likely to be small integers (e.g. 3 or 4), a truth table may be used to compute the approximate accuracy. If the accuracy exceeds a specified upper threshold value (U), the n-bit (e.g. 2-bit) saturating counter may be incremented if it is not already saturated. If the accuracy is below a specified low threshold value (L), the 2-bit saturating counter may be decremented if it is not already zero. If the accuracy is between U and L, the 2-bit saturating counter may be left unchanged. Those skilled in the art will appreciate that while the embodiments discussed herein feature a 2-bit counter, alternative embodiments may incorporate counters having a higher or lower number of bits as required, and that a number of different types of counters may equally be used. Consequently, various embodiments are not limited to the 2-bit counter disclosed herein.

Based on the value of the 2-bit counter, a variable number of the most recently used miss addresses (402) in the correlation table entry's correlation list may be used to generate prefetches. The mapping between the counter value and the prefetch degree (D) may be implemented as a design parameter. Field 406 may then be set to the number of prefetches actually issued (which may be less than the chosen prefetch degree as some of the prefetches may be duplicates), while field 408 may be reset to zero. Field 408 may be incremented whenever a line prefetched by that correlation table entry is actually used by a demand request.

By constructing a correlation table according to the principles used in obtaining correlation tables 100 and/or 400, for example, the accuracy of the resulting correlation prefetcher may be enhanced, making it more suitable for implementation with CMT (chip multithreading) processors where memory bandwidth may be a precious resource. The techniques represented in the respective embodiments of table 100 and table 400 may be applied either together or individually.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for prefetching data and/or instructions from a main memory to a secondary memory, the method comprising:
   generating control flow information, comprising storing respective information for each retired instruction of one or more retired instructions;
   storing a plurality of addresses, wherein for each retired instruction of one or more retired instructions that incur one or more secondary memory misses, storing the plurality of addresses comprises:
      storing respective one or more addresses for the retired instruction, wherein the respective one or more addresses correspond respectively to the one or more secondary memory misses;
      wherein storing the respective one or more addresses comprises storing the respective one or more addresses to an entry in a table by using an index for the entry, wherein determining the index for the entry involves using an address for an older retired instruction that incurred one or more secondary memory misses and control flow information for the older retired instruction;
   for each incurred secondary memory miss, performing a prefetch operation according to:
      a respective address corresponding to the incurred secondary memory miss;
      the control flow information; and
      the plurality of addresses.

2. The method of claim 1, wherein the one or more instructions comprise one or more branch instructions, wherein said storing respective information for each retired instruction comprises storing respective information for each retired branch instruction, wherein the respective information for each retired branch instruction comprises:
   a direction of the retired branch instruction; and/or
   a target of the retired branch instruction.

3. The method of claim 1, further comprising specifying at least a first portion of the control flow information to correspond to the respective address;
   wherein said performing the prefetch operation comprises accessing a specified entry in a correlation table, wherein the specified entry is indexed by a combination of:
      a first number of bits of the respective address; and
      a second number of bits of the at least first portion of the control flow information corresponding to the respective address.

4. The method of claim 3, wherein the specified entry in the correlation table comprises:
   a tag; and
   an address list comprising specified addresses of the plurality of addresses;
   wherein said performing the prefetch operation comprises prefetching data from one or more locations in the main memory according to:

the tag of the specified entry; and
a first number of addresses of the address list of the specified entry.

5. The method of claim 1, further comprising storing prefetch information, said storing the prefetch information comprising storing respective information for each one of one or more previously performed prefetch operations;
wherein said performing the prefetch operation comprises performing the prefetch operation according to the prefetch information.

6. A system comprising:
a processing unit;
a main memory configured to store instructions executable by the processing unit, and further configured to store data used by the processing unit;
a secondary memory configured to cache instructions and/or data from the main memory; and
a control unit configured to:
generate control flow information by storing respective information for each retired instruction of one or more retired instructions;
store a plurality of addresses by storing respective one or more addresses for each retired instruction of one or more retired instructions that incur one or more secondary memory misses;
wherein storing the respective one or more addresses comprises storing the respective one or more addresses to an entry in a table by using an index for the entry, wherein determining the index for the entry involves using an address for an older retired instruction that incurred one or more secondary memory misses and control flow information for the older retired instruction; and
for each incurred secondary memory miss, perform a prefetch operation from the main memory to the secondary memory according to:
a respective address corresponding to the incurred secondary memory miss;
the control flow information; and
the plurality of addresses.

7. The system of claim 6, further comprising one or more additional processing units, wherein the main memory is further configured to store instructions executable by the one or more additional processing units, and further configured to store data used by the one or more additional processing units.

8. The system of claim 6, wherein the processing unit comprises multiple processor cores, and wherein the system is a multi-core processor chip.

9. The system of claim 6, wherein the secondary memory is a level 2 cache memory.

10. A method for prefetching instructions and/or data from a system memory to a cache memory, the method comprising:
store a plurality of addresses by storing respective one or more addresses for each retired instruction of one or more retired instructions that incur one or more cache misses;
wherein storing the respective one or more addresses comprises storing the respective one or more addresses to an entry in a first table by using a tag for the entry, wherein determining the tag for the entry involves using an address for an older retired instruction that incurred one or more cache misses and control flow information for the older retired instruction; and
accessing a specified entry in the first table in response to a given cache miss, wherein the specified entry comprises a specified tag and a specified list of addresses, wherein said accessing the specified entry is performed according to a specified index comprising:
at least a subset of bits from a specified cache miss address corresponding to the given cache miss; and
additional bits representing program control flow information indicative of a specified program control flow that led to the given cache miss; and
performing a prefetch operation according to the specified tag and at least a first number of respective addresses from the specified list of addresses.

11. The method of claim 10, wherein said performing the prefetch operation comprises:
checking the specified tag against a given tag corresponding to the given cache miss; and
transferring instructions/and or data from one or more respective target addresses in the system memory to the cache memory, when the specified tag matches the given tag, wherein each respective target address of the one or more respective target addresses is determined by the specified tag and a respective address of the at least first number of respective addresses.

12. The method of claim 10, wherein the specified entry further comprises a counter value representative of an accuracy history of previously issued prefetches corresponding to the specified entry;
wherein the method further comprises determining the first number according to the counter value, prior to said performing the prefetch operation.

13. The method of claim 12, wherein the specified entry further comprises:
a second number indicative of most recent previously issued prefetches corresponding to the specified entry; and
a third number indicative of how many of the most recent previously issued prefetches corresponding to the specified entry result in subsequent cache hits;
wherein the method further comprises adjusting the counter value according to the second number and the third number, prior to said determining the first number.

14. The method of claim 13, wherein said adjusting the counter value comprises:
incrementing the counter value when a ratio of the third number to the second number exceeds a specified first threshold value;
decrementing the counter value when the ratio of the third number to the second number is below a specified second threshold value; and
leaving the counter value unchanged when the ratio of the third number to the second number is between the specified first threshold value and the specified second threshold value.

15. The method of claim 10, further comprising maintaining a plurality of entries in the first table, wherein each entry comprises a respective tag and a respective list of addresses, said maintaining comprising:
at the retirement of each instruction, storing respective control flow information corresponding to the retired instruction in a first buffer, wherein contents of the first buffer as a whole represent program control flow history;
at the retirement of each of the retired instructions that incur one or more cache misses:
updating a matching entry, when the index corresponds to a matching entry of the plurality of entries; and
generating a new entry corresponding to the index, when the index does not correspond to anyone of the plurality of entries, wherein the new entry becomes one of the plurality of entries; and wherein the address for the older retired instruction includes a least recently stored cache miss address.

16. The method of claim 15, wherein said updating the matching entry comprises updating the respective list of addresses of the matching entry with a specified number of cache miss addresses from the second buffer, when the respective tag of the matching entry matches a tag corresponding to the incurred cache miss.

17. The method of claim 15, wherein said updating the matching entry comprises invalidating the matching entry and generating a new entry corresponding to the index, when the respective tag of the matching entry does not match a tag corresponding to the incurred cache miss.

18. The method of claim 15, wherein said generating the new entry comprises:

generating the respective tag of the new entry by copying a tag corresponding to the incurred cache miss to the new entry; and generating the respective list of addresses of the new entry by copying at least a subset of all cache miss addresses stored in the second buffer to the new entry.

19. A processing unit comprising:

a processing core configured to execute instructions stored in a main memory;

one or more levels of cache memory for caching instructions and/or data from the main memory;

a control unit configured to manage correlation prefetching for prefetching instructions and/or data from the main memory to respective cache memories of at least one of the one or more levels of cache memory, wherein the control unit comprises:

a first buffer configured to store program control flow information corresponding to retired branch instructions; and a second buffer configured to store cache miss addresses corresponding to retired branch instructions that incur a cache miss;

wherein the control unit is configured to store a plurality of addresses by storing respective one or more addresses for each retired instruction of one or more retired instructions that incur one or more secondary memory misses;

wherein storing the respective one or more addresses comprises storing the respective one or more addresses to an entry in a table by using an index for the entry, wherein determining the index for the entry involves using an address for an older retired instruction that incurred one or more secondary memory misses and control flow information for the older retired instruction; and wherein the control unit is configured to perform a memory prefetch operation according to the stored program control flow information and the stored cache miss addresses each time a cache miss is incurred for the respective cache memories of the at least one of the one or more levels of cache memory.

20. The processing unit of claim 19, further comprising one or more additional processing cores configured to execute the instructions stored in the main memory, wherein the control unit is configured to couple the processing core and the one or more additional processing cores to the respective cache memories of the at least one of the one or more levels of cache memory.

\* \* \* \* \*